(12) United States Patent
Achanta et al.

(10) Patent No.: US 12,141,052 B2
(45) Date of Patent: *Nov. 12, 2024

(54) RESILIENT ESTIMATION FOR GRID SITUATIONAL AWARENESS

(71) Applicant: General Electric Company, Schenectady, NY (US)

(72) Inventors: Hema K Achanta, Schenectady, NY (US); Masoud Abbaszadeh, Clifton Park, NY (US); Weizhong Yan, Clifton Park, NY (US); Mustafa Tekin Dokucu, Latham, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/321,545

(22) Filed: May 22, 2023

(65) Prior Publication Data

US 2023/0385186 A1 Nov. 30, 2023

Related U.S. Application Data

(63) Continuation of application No. 16/525,807, filed on Jul. 30, 2019, now Pat. No. 11,693,763.

(51) Int. Cl.
G06F 11/36 (2006.01)
G06F 11/263 (2006.01)
(Continued)

(52) U.S. Cl.
CPC ........ G06F 11/3684 (2013.01); G06F 11/263 (2013.01); G06F 18/213 (2023.01);
(Continued)

(58) Field of Classification Search
CPC .... G06F 11/3684; G06F 11/34; G06F 11/263; G06F 40/279; G06F 16/81; G06F 11/10;
(Continued)

(56) References Cited

U.S. PATENT DOCUMENTS 9,112,253 B2    8/2015  Payne et al.
9,781,141 B2 *  10/2017 Barkan ............... H04L 63/1408
(Continued)

FOREIGN PATENT DOCUMENTS

CN    105303020 A    2/2016
CN    108596524 A    9/2018
CN    108931700 A    12/2018

OTHER PUBLICATIONS

Saeed Ahmadian: "Cyber Attacks on Smart Energy Grids Using Generative Adverserial Networks" 2018 IEEE Global Conference on Signal and Information Processing (GlobalSIP), Nov. 26-29, 2018, pp. 942-946, Conference Location: USA.
(Continued)

Primary Examiner — Kyung H Shin
(74) Attorney, Agent, or Firm — Morgan, Lewis & Bockius LLP

(57) ABSTRACT

According to some embodiments, a system, method and non-transitory computer-readable medium are provided to protect a cyber-physical system having a plurality of monitoring nodes comprising: a normal space data source storing, for each of the plurality of monitoring nodes, a series of normal monitoring node values over time that represent normal operation of the cyber-physical system; a situational awareness module including an abnormal data generation platform, wherein the abnormal data generation platform is operative to generate abnormal data to represent abnormal operation of the cyber-physical system using values in the normal space data source and a generative model; a memory for storing program instructions; and a situational awareness processor, coupled to the memory, and in communication with the situational awareness module and operative to execute the program instructions to: receive a data signal, wherein the received data signal is an aggregation of data signals received from one or more of the plurality of
(Continued)

monitoring nodes, wherein the data signal includes at least one real-time stream of data source signal values that represent a current operation of the cyber-physical system; determine, via a trained classifier, whether the received data signal is a normal signal or an abnormal signal, wherein the trained classifier is trained with the generated abnormal data and normal data; localize an origin of an anomaly when it is determined the received data signal is the abnormal signal; receive the determination and localization at a resilient estimator module; execute the resilient estimator module to generate a state estimation for the cyber-physical system. Numerous other aspects are provided.

20 Claims, 8 Drawing Sheets

(51) Int. Cl.
| | |
|---|---|
| *G06F 18/213* | (2023.01) |
| *G06F 18/214* | (2023.01) |
| *G06F 18/24* | (2023.01) |
| *G06N 3/08* | (2023.01) |
| *G06V 10/82* | (2022.01) |
| *H04L 9/40* | (2022.01) |
| *H04L 41/16* | (2022.01) |
| *H04L 43/12* | (2022.01) |
| *H04W 12/128* | (2021.01) |
| *G06N 3/04* | (2023.01) |

(52) U.S. Cl.
CPC ............ *G06F 18/214* (2023.01); *G06F 18/24* (2023.01); *G06N 3/08* (2013.01); *G06V 10/82* (2022.01); *H04L 41/16* (2013.01); *H04L 43/12* (2013.01); *H04L 63/1441* (2013.01); *H04W 12/128* (2021.01); *G06N 3/0418* (2013.01)

(58) Field of Classification Search
CPC ............... G06F 40/143; G06F 11/3664; G06F 11/3688; G06F 17/18; G06F 21/554; G06F 21/561; G06F 21/57; G06F 21/566; G06F 3/167; H04L 43/50; H04L 63/1408; H04L 63/145; H04L 63/1441; H04L 63/1416; G06N 5/045; G06N 20/00; G06Q 30/0241; G06Q 30/0242; H04W 12/128; G10L 15/07; G10L 13/033; G10L 25/51

See application file for complete search history.

(56) References Cited

U.S. PATENT DOCUMENTS

| | | | | |
|---|---|---|---|---|
| 10,468,014 | B1* | 11/2019 | Edwards | ................. G10L 15/07 |
| 2014/0122945 | A1* | 5/2014 | Sakai | .................... G06F 11/263 |
| | | | | 714/49 |
| 2017/0168885 | A1* | 6/2017 | Jain | ...................... G06F 11/3684 |
| 2018/0129760 | A1* | 5/2018 | Kazerouni | ......... G06Q 30/0241 |
| 2018/0262525 | A1 | 9/2018 | Yan et al. | |
| 2020/0117582 | A1* | 4/2020 | Srivastava | .......... G06F 11/3684 |

OTHER PUBLICATIONS

Nikolaivoropai et. al: Resilience Assessment of the State Estimation Software under Cyber Attacks", Rudenko International Conference " Methodological problems in reliability study of large energy, Oct. 10, 2018, vol. 58.

Saleh Solt An et. al: "Algorithms for Power Grid State Estimation after Cyber-Physical Attacks" Performance Evaluation Review, Sep. 2017, vol. 45, Issue: 2, pp. 111-114.

* cited by examiner

RESILIENT ESTIMATION FOR GRID SITUATIONAL AWARENESS

CROSS REFERENCE TO RELATED APPLICATION

This application is a continuation of U.S. patent application Ser. No. 16/525,807 filed Jul. 30, 2019, which is incorporated herein by reference in its entirety.

BACKGROUND

Industrial control systems that operate physical systems (e.g., associated with power grids, power turbines, jet engines, locomotives, autonomous vehicles, etc.) are increasingly connected to the Internet. As a result, these control systems have been increasingly vulnerable to threats, such as cyber-attacks (e.g., associated with a computer virus, malicious software, etc.) that could disrupt electric power generation and distribution, damage engines, inflict vehicle malfunctions, etc. For example, these attacks may introduce false data into the control system, which the control system interprets as coming from sensors of the physical system. The control system may then operate the physical system based on the false data, with negative consequences. Such attacks can diminish the performance of a control system and may cause total shut down or even catastrophic damage to the physical system.

Existing approaches to protect an industrial control system, such as failure and diagnostics technologies, may not adequately address this problem.

It would be desirable to provide systems and methods to improve security of a cyber-physical system in an automatic and accurate manner.

SUMMARY

According to some embodiments, a system includes a normal space data source storing, for each of the plurality of monitoring nodes, a series of normal monitoring node values over time that represent normal operation of the cyber-physical system; a situational awareness module including an abnormal data generation platform, wherein the abnormal data generation platform is operative to generate abnormal data to represent abnormal operation of the cyber-physical system using values in the normal space data source and a generative model; a memory for storing program instructions; and a situational awareness processor, coupled to the memory, and in communication with the situational awareness module and operative to execute the program instructions to: receive a data signal, wherein the received data signal is an aggregation of data signals received from one or more of the plurality of monitoring nodes, wherein the data signal includes at least one real-time stream of data source signal values that represent a current operation of the cyber-physical system; determine, via a trained classifier, whether the received data signal is a normal signal or an abnormal signal, wherein the trained classifier is trained with the generated abnormal data and normal data; localize an origin of an anomaly when it is determined the received data signal is the abnormal signal; receive the determination and localization at a resilient estimator module; and execute the resilient estimator module to generate a state estimation for the cyber-physical system.

According to some embodiments, a computer-implemented method includes receiving a data signal, wherein the received data signal is an aggregation of data signals received from one or more of a plurality of monitoring nodes, wherein the data signal includes at least one real-time stream of data source signal values that represent a current operation of the cyber-physical system; determining, via a trained classifier, whether the received data signal is a normal signal or an abnormal signal, wherein the trained classifier is trained with the generated abnormal data and normal training data; localizing an origin of an anomaly when it is determined the received data signal is the abnormal signal; receiving the determination and localization at a resilient estimator module; and executing the resilient estimator module to generate a state estimation for the cyber-physical system.

According to some embodiments, a non-transitory computer-readable medium storing instructions that, when executed by a computer processor, cause the computer processor to perform a method including receiving a data signal, wherein the received data signal is an aggregation of data signals received from one or more of a plurality of monitoring nodes, wherein the data signal includes at least one real-time stream of data source signal values that represent a current operation of the cyber-physical system; determining, via a trained classifier, whether the received data signal is a normal signal or an abnormal signal, wherein the trained classifier is trained with the generated abnormal data and normal training data; localizing an origin of an anomaly when it is determined the received data signal is the abnormal signal; receiving the determination and localization at a resilient estimator module; and executing the resilient estimator module to generate a state estimation for the cyber-physical system.

Some technical effects of some embodiments disclosed herein are improved systems and methods to protect a cyber-physical system (CPS) from malicious intent such as cyber-attacks, and from device malfunctions, in an automatic and accurate manner. Another technical effect of some embodiments is the provision of resilient estimation for CPS states/parameters in the presence of adversaries; anomaly detection and isolation in the CPS using a combined normal and synthetic adversary dataset generation; redundant CPS parameter estimation during normal operations; increased reliability on the CPS and resilience to malicious intent and natural disasters. One or more embodiments provide a solution for power grid situational awareness both during cyber-attacks and natural disasters, as well as correcting estimates that have been impacted by cyber attacks in order to provide safe operation of the power grid (or other CPS). One or more embodiments use conditional and complementary generative adversarial networks (GAN) to generate simulated attack data to solve an optimization problem to build real-time estimates of the power grid parameters. The GANs may be used for simulating attack data because, in practice, the alternative—grid models—is very complex and hard to build. One or more embodiments provide for maintaining CPS operation even when the attack is in progress by leveraging contextual (i.e., conditional) information of the CPS from sensors, weather, demand, location, etc. to estimate the CPS parameters. In one or more embodiments, the locations of the attack are determined via a classifier trained on the normal data from field or simulation and the simulated attack data generated by the conditional and complementary GANs and via a localization process that identifies the attacked set of nodes. The simulated attack data along with the available normal field data are used by the classifier to build a decision boundary which may be used in real-time to predict whether the system is normal or has been attacked.

DETAILED DESCRIPTION

Figure 1:
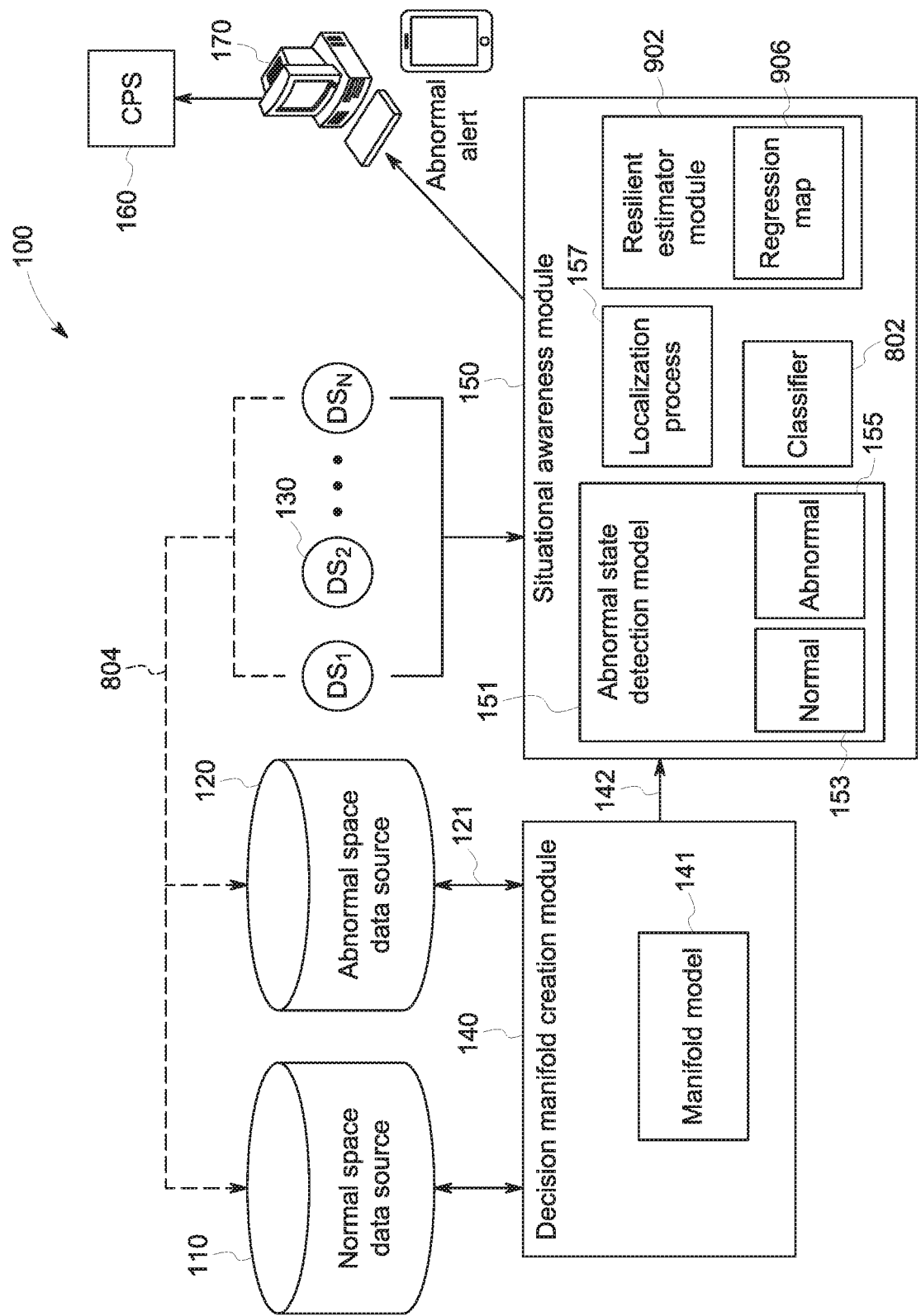
FIG. 1 is a high-level block diagram of a system that may be provided in accordance with some embodiments.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

A CPS, such as an Industrial Control Systems ("ICS"), may be associated with large-scale systems having many monitoring nodes. Some embodiments described herein may provide scalable and efficient solutions for abnormality (e.g., cyber-attack or fault) detection in such systems. The cyber-physical system may be associated with at least one of: (i) a power grid, (ii) an industrial control system, (iii) a heat recovery and steam generation unit, (iv) a turbine, (v) a gas turbine, (vi) an engine, (vi) a jet engine, (viii) a locomotive engine, (ix) a refinery, (x) a dam, (xi) an autonomous vehicle; and (xii) a drone. The monitoring node may be associated with at least one of: (i) a sensor node, (ii) a critical sensor node, (iii) an actuator node, (iv) a controller node, and (v) a key software node. According to some embodiments, a system level detection decision may be made using a global decision boundary. The system may also compute decision boundaries for each subsystem in a similar fashion. The features used to compute decision boundaries for each subsystem may be comprised of, for example, local features for each component within the subsystem plus features representing the interaction of two or more of such components.

Resilient state estimation is a method that can correctly estimate the true state of the system despite attacks on sensors. As such, accurate resilient state estimation may be a key task performed by a CPS to build situational awareness and make timely decisions for efficient control of the CPS. Conventional state estimation techniques estimate the current state or parameters of the CPS based on the available input data from nodes/sensors in the CPS. These conventional state estimation techniques trust the incoming stream of input data, which may include measurements from sensors (e.g., when the CPS is a power grid, the sensors may be phasor measurement units (PMUs)). However, the sensors may be prone to adversarial attacks, making the resilient state estimation vulnerable to error. The adversarial attack may include the injection of false data into the state estimation process to trick a controller/operator of the CPS to make decisions that may be harmful to the CPS. While a set of potential attack vectors for false data injection attacks that cannot be detected by a class of nonlinear power grid state estimators has been conventionally proposed, the defense against such attacks on the state estimation is still an open problem. Conventionally it has been addressed by building conventional optimization-based approaches for specific attack scenarios (e.g., the adversary tries to take down some of the transmission lines or obstructs data along some of the lines). However, with this conventional optimization-based approach, the specific attack scenarios are generated, and it is infeasible to simulate all possible abnormalities or attacks. Further the simulations may consider only "guesses" of possible attacks based on experience, whereas the adversaries may be innovating new possible ways of attack based, for example, on currently unknown gaps in the CPS and security.

Embodiments herein may be described with respect to a non-exhaustive example of a power grid. However, the embodiments described herein may apply to any other suitable CPS.

Embodiments provide for a situational awareness module for resilient estimation of a CPS state and parameters in the presence of anomalies (such as those due to natural disasters) and adversarial targeting (e.g., cyber-attacks). The situational awareness module may, in one or more embodiments, build a constrained optimization based resilient state estimator that leverages a variant of Generative Adversarial Networks (GAN) for inference and data generation in a broad range of attack scenarios. One or more embodiments may efficiently and accurately estimate the current state of the CPS for situational awareness.

One or more embodiments provide for the accurate detection of the current state of the CPS, whose data may be experiencing an attack, while the actual CPS is operating normally. One or more embodiments provide for intercepting a data signal prior to receipt by the controller to determine whether the data signal is abnormal or normal. When it is determined that the data signal is abnormal, a current state of the CPS may then be determined to see if the CPS is operating abnormally, or if the data has been compromised. In some embodiments, this determination may be based on complementary simulated data and a state estimation process. These determinations may then be sent to the controller for further appropriate action.

FIG. 1 is a high-level architecture of a system 100 in accordance with some embodiments. The system 100 may include a "normal space" data source 110 and an "abnormal space" data source 120. The normal space data source 110 and the abnormal data source 120 may store, for each of a plurality of heterogeneous "data source nodes" 130 (shown in FIG. 1 as "$DS_1$," "$DS_2$," . . . "$DS_N$" for "1, 2, . . . N" different data source nodes), a series of normal values over time that represent normal operation of a CPS (e.g., generated by a model or collected from actual data source node 130 data as illustrated by the dashed line in FIG. 1). As used herein, the phrase "data source node" might refer to, for example, sensor data, physics-based models, data-driven models, and patient/user inputs. The nodes may receive data from other aspects of the system in a continuous fashion in the form of continuous signals or streams of data or combinations thereof. Moreover, the nodes 130 may be used to monitor occurrences of cyber-threats or abnormal events.

The abnormal space data source 120 may store, for each of the data source nodes 130, a series of abnormal values that represent an abnormal operation of the CPS (e.g., when the system is experiencing a cyber-attack or fault). In one or more embodiments, physics-based and other models may be used to generate "abnormal" data ("training data sets"). For example, attack signatures may be induced on the data and then the resulting effects on the data may be analyzed to determine how faults affect the data versus attacks affect the data. According to some embodiments, the data source nodes 130 provide "heterogeneous" data. That is, the data may represent information from widely diverse areas, such as sensors, patient/user inputs, models, etc.

Information from the normal space data source 110 and the abnormal space data source 120 may be provided to an offline decision manifold creation module 140 that uses this data to create a decision boundary (that is, a boundary that separates normal behavior from abnormal behavior). It is noted that while an offline decision manifold may be described herein, one or more embodiments may use a computing online decision manifold. The decision boundary may then be used by an abnormal state detection model 151 of a situational awareness module 150. The situational awareness module 150 may, for example, monitor streams of data from the data source nodes 130 comprising data from sensor nodes, and/or any other critical data source nodes (e.g., data source nodes $DS_1$ through $DS_N$), calculate at least one "feature" for each data source node based on the received data, and "automatically" output an abnormality status signal to one or more remote monitoring devices 170 when appropriate (e.g., for display to a user). According to some embodiments, the abnormality status signal might be transmitted to a device controller, a system controller, a Human-Machine Interface ("HMI"), or to a user via a number of different transmission methods. Note that one receiver of the abnormality status signal might be a cloud database. The abnormality status signal may indicate to the recipient that the CPS is experiencing, or will be experiencing, a fault, or a cyber-attack ("compromise").

Some embodiments described herein may use time series data from one or more monitoring nodes 110 from a cyber-physical (i.e., industrial or enterprise) asset and provide a reliable abnormality detection with a low false positive rate. The system may extract features from the time series data for each monitoring node. As used herein, the term "feature" may refer to, for example, mathematical characterizations of data. Examples of features as applied to data might include the maximum, minimum, mean, standard deviation, variance, range, current value, settling time, Fast Fourier Transform ("FFT") spectral components, linear and non-linear principal components, independent components, sparse coding features, deep learning features, etc. The type and number of features for each monitoring node might be optimized using domain-knowledge and/or a feature discovery process. The features may be, for example, calculated over a sliding window with consecutive samples of specified duration from time series data. The length of the window and the duration of overlap for each batch may be determined from domain knowledge and an inspection of the data or using batch processing. Note that features may be computed at the local level (associated with each monitoring node) and the global level (associated with all the monitoring nodes, i.e., the whole asset). The time-domain values of the nodes or their extracted features may be, according to some embodiments, normalized for better numerical conditioning.

Moreover, the term "automatically" may refer to, for example, actions that can be performed with little or no human intervention.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The offline decision manifold creation module 140 may store information into and/or retrieve information from various data stores, such as the normal space data source 110 and/or the abnormal space data source 120. The various data sources may be locally stored or reside remote from the offline decision manifold creation module 140 (which may be associated with, for example, offline or online learning). Although a single offline decision manifold creation module 140 is shown in FIG. 1, any number of such devices may be included. Moreover, various devices described herein might be combined according to embodiments of the present invention. For example, in some embodiments, the offline decision manifold creation module 140 and one or more data sources 110, 120 might comprise a single apparatus. The offline decision manifold creation module 140 functions may be performed by a constellation of networked apparatuses, in a distributed processing or cloud-based architecture.

A user may access the system 100 via one of the monitoring devices 170 (e.g., a Personal Computer ("PC"), tablet, or smartphone) to view information about and/or manage abnormal information in accordance with any of the embodiments described herein. In some cases, an interactive graphical display interface may let a user define and/or adjust certain parameters (e.g., abnormal state detection trigger levels) and/or provide or receive automatically generated recommendations or results from the offline decision manifold creation module 140 and/or situational awareness module 150.

Note that methods of attack detection, or more generally Anomaly Detection ("AD"), can be broadly categorized in two groups: supervised and semi-supervised. Supervised learning, such as is illustrated in the system of FIG. 1, is a machine learning task of learning a function that maps an input to an output based on example input-output pairs. It infers a function from labeled training data consisting of a set of training examples. In supervised learning, each example is a pair consisting of an input object (typically a vector) and a desired output value (also called the supervisory signal). A supervised learning algorithm analyzes the training data (including information from both the normal space data source 120 and the abnormal space data source 130) and produces an inferred function, which can be used for mapping new examples.

While supervised AD methods require both normal and abnormal data, semi-supervised AD methods work on normal data only. A semi-supervised process may first employ clustering of all existing data (e.g., based on data features) and then identify the attack/anomaly decision boundaries in the feature space. Unsupervised learning, also known as self-organization, is associated with a method of modelling the probability density of inputs. For example, cluster analysis machine learning might group data that has not been labelled, classified, or categorized (e.g., using only information from the normal space data source 120). Semi-supervised learning is a class of machine learning tasks and techniques that also make use of unlabeled data for training—typically a small amount of labeled data (e.g., in the abnormal space data source 130) with a large amount of unlabeled data (e.g., in the normal space data source 120). Semi-supervised learning falls between unsupervised learning (without any labeled training data) and supervised learning (with completely labeled training data).

When sufficient and well-distributed data (both normal and abnormal) are available, supervised AD methods have proven to be superior over semi-supervised methods in terms of detection performance (accuracy and robustness). Thus, supervised AD methods are theoretically a preferred choice for achieving highest possible detection performance.

In practice, however, labeled abnormal or attack data for most real-world applications, particularly CPS attack detection, are not available or, at best, only sparsely available. One solution to this situation is to use semi-supervised AD methods that work on normal data only, although this may not be able to achieve a desired detection performance. Alternatively, when a physics-based simulator is available, the system might simulate abnormal or attack data such that a supervised AD method can still be used. However, it is still infeasible to simulate all possible abnormalities or attacks, because abnormalities and attacks evolve over time and new types of attacks constantly emerge. Without sufficient, well-distributed data samples for all abnormalities/attacks, supervised AD methods may not be able to achieve a required performance potential.

Because achieving the highest possible detection performance (e.g., represented by accuracy and robustness) is almost always a key objective when developing an AD system, enabling supervised AD methods (with superior detection performance) to work effectively even in situations where abnormal or attack data is not (or is sparsely) available may be desirable when developing high performance AD systems. Some embodiments described herein are associated with techniques that target and resolve this problem.

Figure 2:
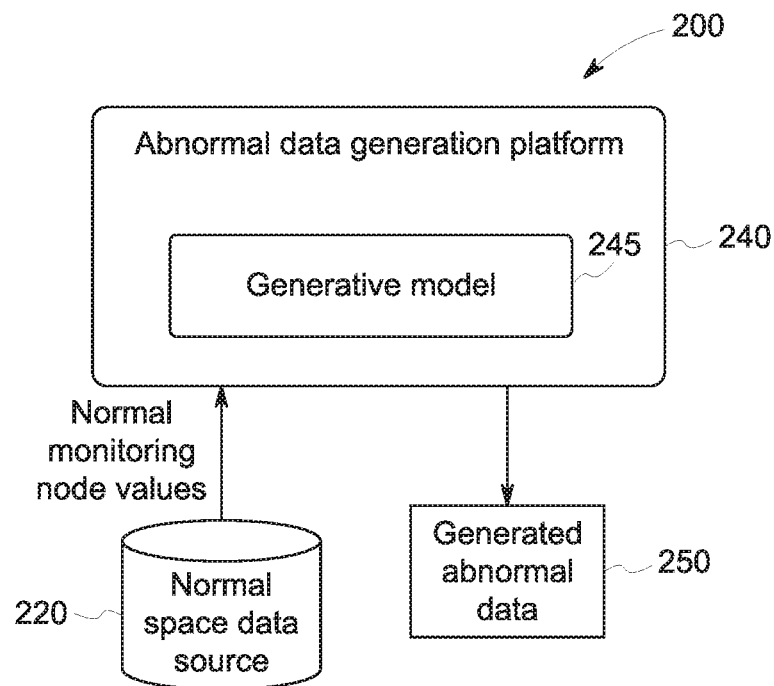
FIG. 2 is a block diagram of an abnormal data generation platform that may be provided in accordance with some embodiments.

FIG. 2 is a high-level block diagram of a system 200 in accordance with some embodiments. The system 200 may, for example, protect a CPS having a plurality of monitoring nodes each generating a series of current monitoring node values over time that represent current operation of the CPS. In particular, the system may include a normal space data source 220 storing, for each of the plurality of monitoring nodes, a series of normal monitoring node values over time that represent normal operation of the CPS. An abnormal data generation platform 240 may utilize information in the normal space data source 220 and a generative model 245 to create generated abnormal data 250 to represent abnormal operation of the CPS. The generated abnormal data 250 might include, for example, automatically generated abnormal feature vectors in feature space. According to some embodiments, the generated abnormal data includes automatically generated abnormal sensor data (which may then be used to create abnormal feature vectors).

The generative model 245 may therefore be used to create generated abnormal data using information from the normal space data source 220. The generative model 245 may be a GAN. A Generative Adversarial Network (GAN) may consist of a generator and a discriminator, which maybe set up to play a minmax non-cooperative game against each other such that the generator's objective is to generate fake data samples from the same probability distribution as that of the actual training dataset, while the discriminator's objective is to distinguish the generated fake samples from the training data samples. However, since the discriminator in the GAN is trained on a very specific task which is to separate the "real" and "fake" samples from the training data distribution, this discriminator cannot be directly used for the classification of the normal data versus the abnormal data. One technique to address this shortcoming with conventional GANs may use Complementary GANs for generating adversarial examples when there is only normal operational data available. Unlike conventional GANs, the generator in the complementary GAN is optimized to generate from a distribution complementary to the normal data (the training data distribution) in feature space that is called a "bad" generator. The generated "bad" (i.e., abnormal) artificial data combined with the normal data may enable the complementary GAN to achieve performance levels that are similar to supervised AD methods with available (e.g., predominantly normal) data.

Figure 3:
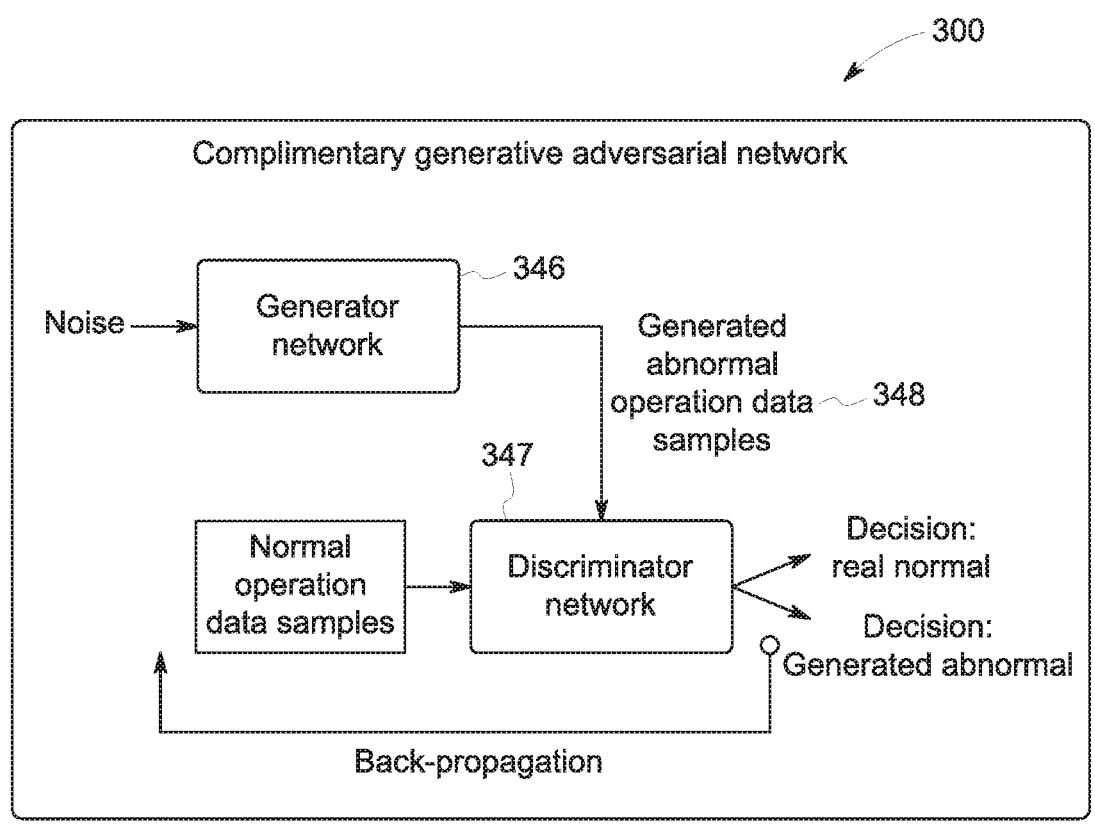
FIG. 3 is a block diagram of a complimentary GAN that may be provided in accordance with some embodiments.

For example, FIG. 3 illustrates 300 a complementary Generative Adversarial Network ("GAN") 300 according to some embodiments. In particular, a generator network 346 may be trained/learn to generate data from a distribution that is close to complementary/complementary to the distribution of the normal data, while a discriminator network 347 is trained to distinguish the complementary samples from the real normal data. The generator network 346 may learn to map from a latent space to a data distribution of interest, while the discriminator network 347 distinguishes candidates produced by the generator from the true data distribution. The training objective of the generator network 346 may be to increase the error rate of the discriminator network 347 (i.e., to "fool" the discriminator network 347) by producing novel candidates of synthetic abnormal operation data that the discriminator network 347 interprets as not synthesized (are part of a true data distribution). Backpropagation may be applied in both networks 346, 347 to improve performance of the complementary GAN. The generator network 346 may comprise, for example, a deconvolutional neural network while the discriminator network 347 is implemented via a convolutional neural network. In this way, some embodiments may utilize the complimentary GAN 300 to create synthetic abnormal samples 348 that, when combined with the normal data, let a system use supervised AD methods (achieving improved detection performance).

Figure 4:
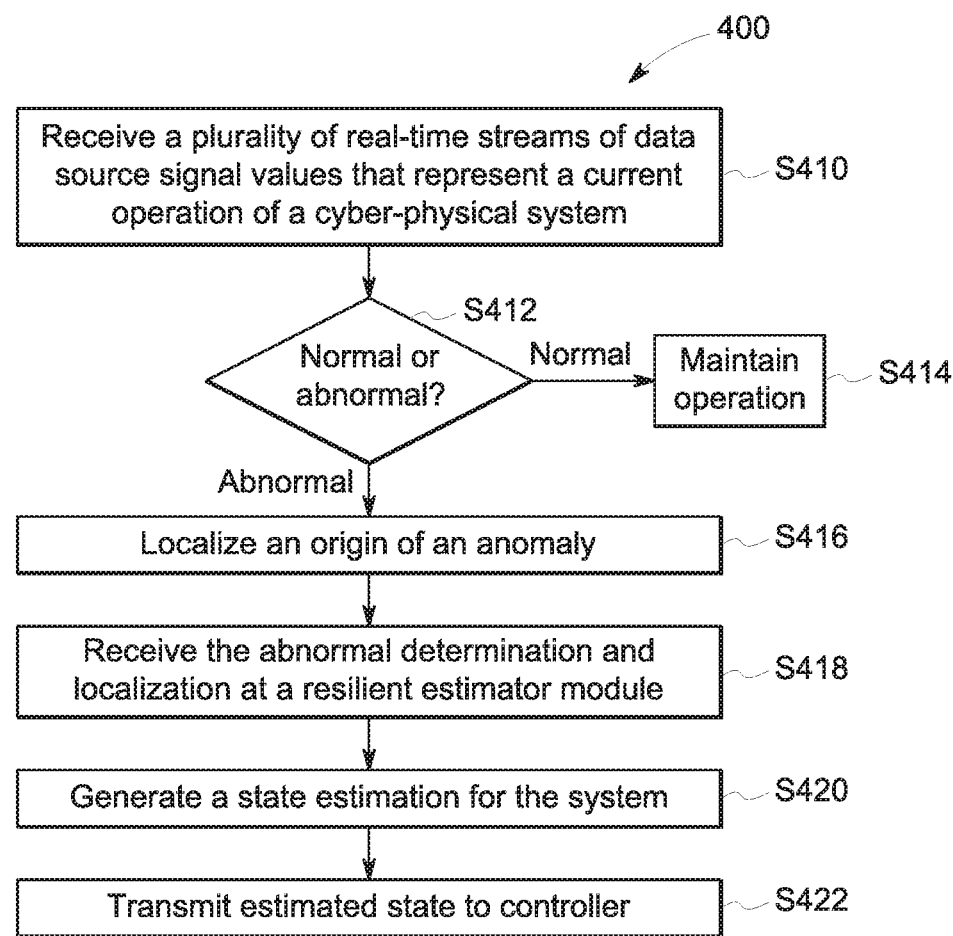
FIG. 4 is a method according to some embodiments.

FIG. 4 illustrates a process 400 that might be performed by some or all of the elements of the systems 100, 200, 300 described with respect to FIGS. 1-6, 8-10. Process 400, and any other process described herein (e.g., process 700 in FIG. 7), may be performed using any suitable combination of hardware (e.g., circuit(s)), software or manual means. For example, a computer-readable storage medium may store thereon instructions that when executed by a machine result in performance according to any of the embodiments described herein. In one or more embodiments, the system 100/200/300 is conditioned to perform the process 400/700 such that the system is a special-purpose element configured to perform operations not performable by a general-purpose computer or device. Software embodying these processes may be stored by any non-transitory tangible medium including a fixed disk, a floppy disk, a CD, a DVD, a Flash drive, or a magnetic tape. Examples of these processes will be described below with respect to embodiments of the system, but embodiments are not limited thereto. The flow charts described herein do not imply a fixed order to the steps, and embodiments of the present invention may be practiced in any order that is practicable.

Initially, at S410, a plurality of real-time heterogeneous data source nodes 110/120 and the situational awareness module 150 may receive streams of data source node signal values ("data" or "data signal") 131 (FIG. 6) that represent a current operation of a CPS 160 (FIG. 1). In one or more embodiments, the source nodes 110/120 may receive (e.g., from sensors) the data over time and, prior to execution of the process, transmit it as normal training data 804, described further below, to a manifold model 141 of the decision manifold creation module 140 to create a manifold 142 or decision boundary to separate normal versus abnormal operation of the system, as described further below. In one or more embodiments, the manifold model 141 may also use abnormal data 121 to create the manifold 142. In one or more embodiments, the data received by the situational awareness module 150 is raw data. It is noted that the use of raw data, as compared to filtered data, in the manifold creation process may provide for a more defined distinction between normal and abnormal operating spaces. In other embodiments, filtered data may be received.

According to some embodiments, all monitoring node data may be converted to features using advanced feature-based methods, and the real-time operation of the control system may be monitored in substantially real-time. The monitoring node data may be expressed in terms of features since features are a high-level representation of domain knowledge and can be intuitively explained. Moreover, embodiments may handle multiple features represented as vectors, and interactions between multiple sensed quantities may be expressed in terms of "interaction features."

Note that many different types of features may be utilized in accordance with any of the embodiments described herein, including principal components (weights constructed with natural basis sets) and statistical features (e.g., mean, variance, skewness, kurtosis, maximum, minimum values of time series signals, location of maximum and minimum values, independent components, etc.). Other examples include deep learning features (e.g., generated by mining experimental and/or historical data sets) and frequency domain features (e.g., associated with coefficients of Fourier or wavelet transforms). Embodiments may also be associated with time series analysis features, such as cross-correlations, auto-correlations, orders of the autoregressive, moving average model, parameters of the model, derivatives and integrals of signals, rise time, settling time, neural networks, etc. Still other examples include logical features (with semantic abstractions such as "yes" and "no"), geographic/position locations, and interaction features (mathematical combinations of signals from multiple monitoring nodes and specific locations). Embodiments may incorporate any number of features, with more features allowing the approach to become more accurate as the system learns more about the physical process and threat. According to some embodiments, dissimilar values from monitoring nodes may be normalized to unit-less space, which may allow for a simple way to compare outputs and strength of outputs.

Abnormalities may be detected by classifying, via a trained classifier 802 (FIG. 8), the monitored data as being "normal" or "abnormal (e.g., disrupted or degraded). As described further below, the decision boundary (manifold) for such classification may be constructed using dynamic models and may help enable early detection of vulnerabilities (and potentially avert catastrophic failures) allowing an operator to restore the control system to normal operation in a timely fashion.

In one or more embodiments, the decision manifold creation module 140 may compute features from the received data and form feature vectors. For example, the system 100 may use weights from a principal component analysis as features. At least one of the feature vectors is associated with principal components, statistical features, deep learning features, frequency domain features, time series analysis features, logical features, geographic or position-based locations, and/or interaction features.

Figure 6:
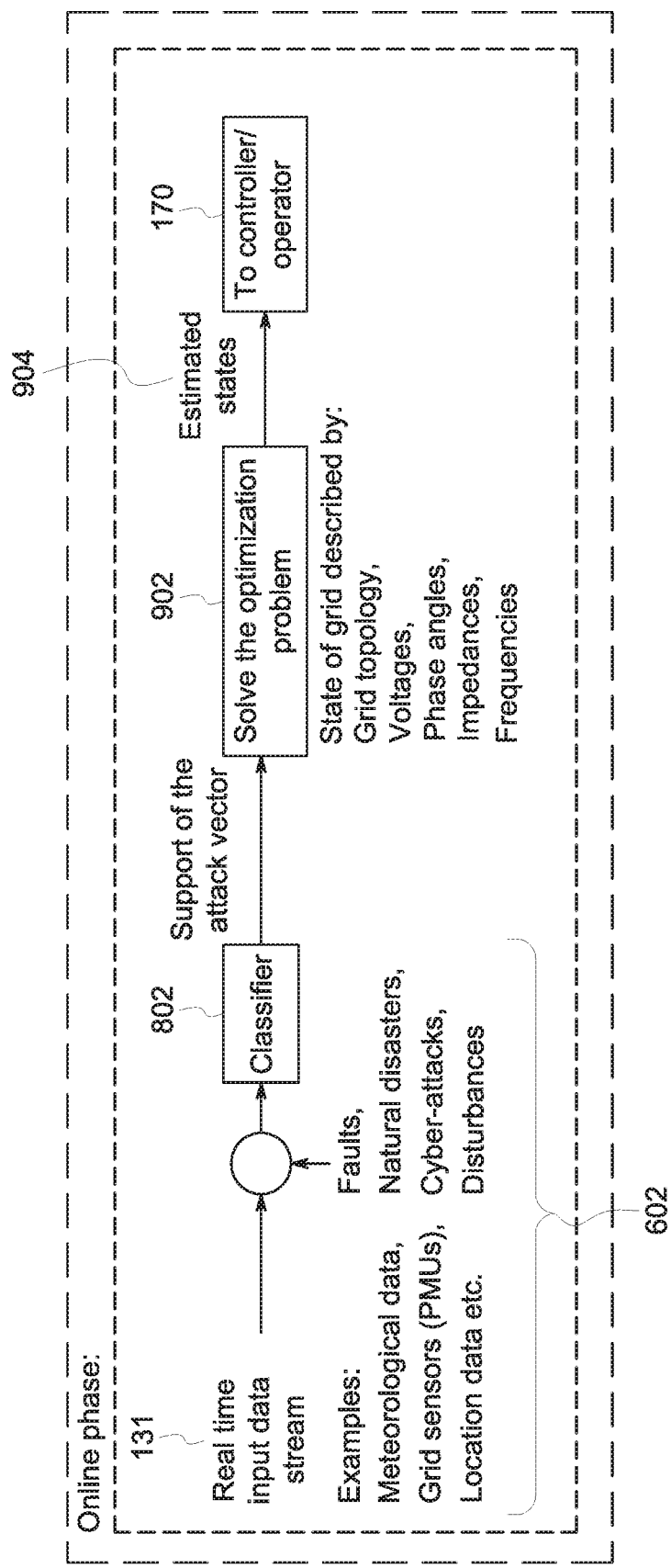
FIG. 6 is an online and real-time situational awareness architecture according to some embodiments.

In one or more embodiments, the situational awareness module 150 may also receive context data 602 (FIG. 6). The context data 602 may be received from a weather station, satellite station or any other suitable source. The context data 602 may include, but is not limited to, meteorological data, time of day, GPS or location coordinates, locational marginal pricing, grid sensor data, etc. In one or more embodiments, the context data 602 may be received in real-time, and stored context data 602 may be used during an off-line phase to build the classifier. As used herein, the use of the context data in a GAN may output a conditional GAN. The conditional GAN, based on this context data, may be more advanced to make sure the data includes particular properties. It is noted that, in one or more embodiments, context data may be used to build situational awareness in the system. The "situation" in this instance may include information of the external factors such as grid demand weather, location of the demands, etc. The definition of "normal" operation may be dependent on the "context" or "situation" of the grid. It is also noted that a strategy for correcting the attacked signals may be dependent on the context data, in one or more embodiments. Inclusion of the context data in detection and estimation may provide for the module to make informed decisions on the strategy to carefully run the system into normal operation in the event there is an attack of a natural disaster.

Turning back to the process 400, after the data 131 is received, then, in S412, it is determined whether the received data signal 131 is a normal signal 153 or an abnormal signal 155. In one or more embodiments, the determination is made via a trained classifier 802. The trained classifier 802 may compare location of generated feature vectors for the received data 131 to the corresponding decision boundary 142 (manifold) (e.g., a linear boundary, non-linear boundary, multi-dimensional boundary, etc.) for that data source node in substantially real time to make a determination whether the received data is normal or abnormal.

According to some embodiments, at least one data source node is associated with a plurality of multi-dimensional decision boundaries and the determination in S412 is performed in connection with each of those boundaries. As used herein, the terms "decision boundary" and "decision manifold" may be used interchangeably. Note that a decision boundary 142 may be generated, for example, in accordance with a feature-based learning algorithm and a high-fidelity model or a normal operation dataset of the CPS.

The trained classifier 802 may be trained with at least generated abnormal data. Training of the trained classifier 802 is described further below with respect to FIGS. 7 and 8. In one or more embodiments, the trained classifier 802 may compare the received data signal 131 to the manifold 142.

Figure 5:
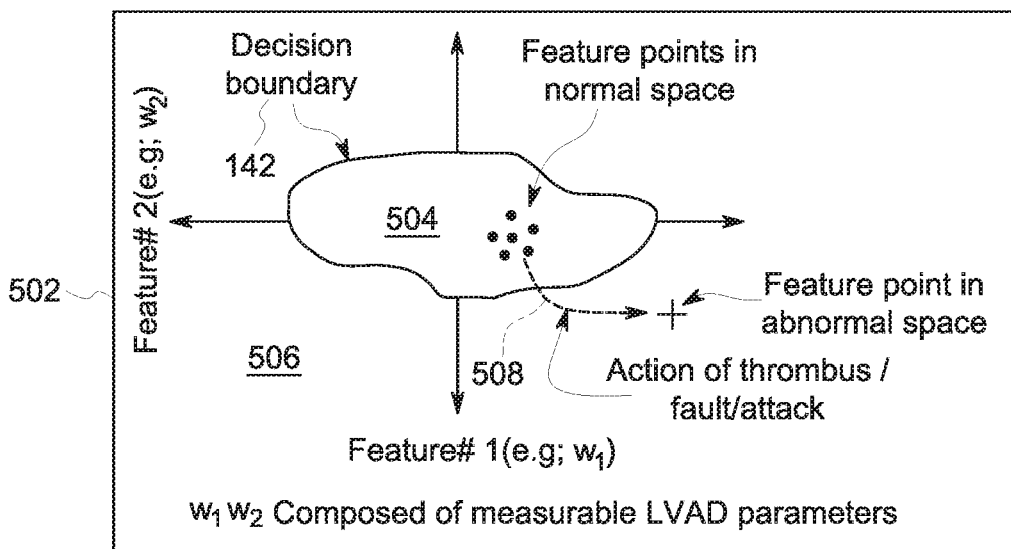
FIG. 5 illustrates boundaries and a feature vector for a CPS parameter according to some embodiments.

A non-exhaustive example of a decision manifold 142, including boundaries and a feature vector that may be associated with data source node parameters in accordance with some embodiments is illustrated in FIG. 5. In particular, a graph 502 includes a first axis representing value weight 1 ("w1"), a feature 1, and a second axis representing value weight 2 ("w2"), a feature 2. Values for w1 and w2 might be associated with, for example, outputs from a Principal Component Analysis ("PCA") that is performed on the input data. PCA may be one of the analyses that may be used by the process to characterize the data, but note that other analyses may be leveraged.

The graph includes a decision boundary 142. The space within the decision boundary (e.g., shaded region), may be the normal operating space 504. The space outside of the decision boundary may be the abnormal operating space 506. The graph also includes an indication associated with current feature location for feature points in the normal operating space 504 (illustrated with a "circle" on the graph), and an indication associated with current feature location for feature points in the abnormal operating space 506 (illustrated with a "+" on the graph). As indicated on the graph 502 by arrow 508, an action of fault or attack may move the location of the feature point from the normal operating space 504 to the abnormal operating space 506. In one or more embodiments, the system may determine the operation of the CPS is normal or abnormal based on the location of the feature point in the decision manifold 142.

Turning back to the process 400, when it is determined in S412 that the received data signal 131 is a normal signal 153, the process 400 proceeds to S414, where the operating state of the CPS is maintained for those features, and the process 400 ends.

When it is determined in S412 that the received data signal 131 is an abnormal signal 155, the process 400 proceeds to S416 and an origin (e.g., data stream associated with a node 130) of an anomaly is localized via a localization process 157. It is noted that the received data signal 131 is an aggregation of multiple signals, and the origin of the anomaly in the attacked signal is determined via the localization process. In one or more embodiments, localization of the anomaly may determine an origin of the threat to a particular monitoring node, thereby indicating which sensors (e.g., sources) are healthy and which are not (e.g., corrupted by attack or fault). As used herein, localization of the anomaly in the abnormal signal source may be referred to as determining "support of the attack vector."

In one or more embodiments, the localization may be performed in accordance with a time at which a decision boundary 142 associated with one monitoring node 130 was crossed as compared to a time at which a decision boundary associated with another monitoring node was crossed. In one or more embodiments, the system may create local decision boundaries as appropriate for each monitoring node. The local decision boundaries may be related to locating the node that has been attacked. Each node may have its own associated decision boundary trained off-line using the generated data. The number of decision boundaries may, in one or more embodiments, equal the number of nodes. Note that the feature extraction and boundary generation process may be performed individually on each and every monitoring node. In one or more embodiments, dynamic models may be used to construct the decision boundaries. An output of the dynamic model may be estimated using stochastic estimation techniques, such as Kalman filtering. The output of each stochastic estimator is compared against its corresponding local decision boundary. If the local boundary is not passed, the monitoring node is normal. Each monitoring node with an estimated feature, per the stochastic estimator, that violates/crosses the corresponding decision boundary is reported as abnormal. The monitoring node that is "abnormal" is the localization of the abnormal data signal.

Figure 9:
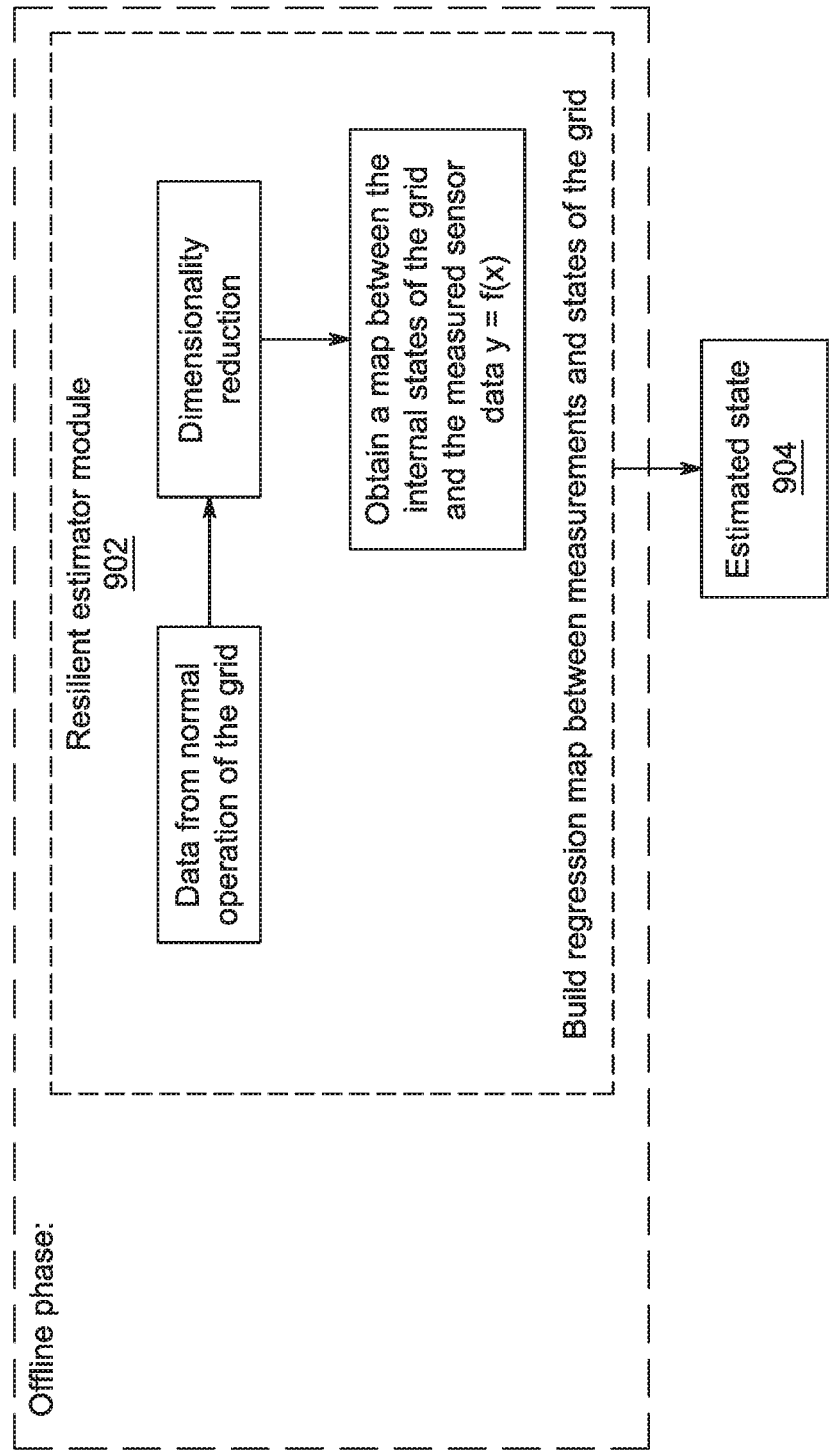
FIG. 9 is situational awareness architecture according to some embodiments.

Next, in S418, the determination of an abnormal signal 155 and the localization of the abnormal signal (e.g., monitoring node that is the source of the abnormal signal) is received at a resilient estimator module 902 (FIG. 9).

In one or more embodiments, the resilient estimator module 902 may execute a resilient state estimation process that may correctly estimate the true state of the system despite attacks on sensors. In one or more embodiments, the resilient estimator module 902 may be a boundary and performance constrained resilient estimator (BPRE). In one or more embodiments, using a dynamic or a static model obtained through any suitable modeling methods, the resilient estimator module 902 is designed to compute an estimate of the true value of the feature vector that is under adversarial attack per the trained classifier 802. The resilient estimator module 902 may be framed as a constrained optimization problem. The mathematical formulation of the optimization problem may be:

$$\min_{x} \|e\|_{\ell_o} + \|v\|_{\ell_o}$$
$$\text{s.t. } y = Cx + e + v$$
$$e^T v = 0.$$

Here, y represents the measurements or observations from the data source (e.g., with respect to a power grid, data from sensors), e is the sparse attack vector, v represents the measurement noise, x is the system state vector (e.g., internal state of the system) and C matrix (C) is a linearized map between the state vector and the observed data. It is noted that solving this optimization problem is in general non-trivial due to the $l_0$ norm on the attack vector and is therefore an np-hard problem. However, as one or more embodiments provide information regarding the support of the attack vector e (i.e., the localization information), then the above constrained optimization problem may be transformed into an equivalent unconstrained optimization problem, which allows the problem to be solved in real-time. Theoretical bounds may be provided on the estimation error given the uncertainty in the support on the attach vector.

In S420, the resilient estimator module 902 is executed to output an estimated state 904 of the true state of the CPS 160 despite abnormal behavior. In one or more embodiments, the "state" of the CPS may refer to the operating condition of the CPS. Some non-exhaustive examples of states for a power grid CPS may include grid topology, voltages, phase angles, impedances, frequencies, etc.

Referring to FIG. 9, prior to execution of the resilient estimator module 902, the resilient estimator module 902 may build a regression map 906 between received data from normal operation of the CPS and states of the CPS. The regression map 906 may be a way to map the internal state variables to the measurement outputs. When the regression map is linear, the regression map 906 may be represented by a measurement matrix. The regression map 906 may be represented by y=Cx, where y is the measured output and x is the internal state of the system, and "C" is the measurement matrix. For example, if the internal states of the system are all available for measurement, then the C matrix may be an identity matrix. The measurement output "y" may be a linear combination of the internal states of the system. The building of the regression map 906 may occur offline (e.g., not necessarily while the CPS is operating). In one or more embodiments, the resilient estimator module 902 may receive normal training data 804 (FIG. 8) from normal operation of the CPS 160. It is noted that the real-time data may be used for prediction. Then, the resilient estimator module 902 may perform a feature dimensionality reduction process to reduce the dimensionality of the received normal training data 804 and thereby generate a selected feature vector subset. This reduction process may proceed as follows: first a feature extraction process is performed with data streams from different sources and the features are then stacked to form local feature vectors in an initial feature set (level 1 features). The multi-modal, multi-disciplinary feature discovery (or "extraction") will most likely lead to a large number of features in the initial feature set. Directly using such a large number of features may be burdensome for down-stream anomaly detection models. The local feature vectors (e.g., initial feature set) are then stacked into one big vector, on which further dimensionality reduction is carried out to obtain what is referred to as higher-level feature vector (i.e., feature of features) or global feature vector. Feature dimensionality reduction may reduce the number of features by removing redundant information and finding patterns in the data while maximally preserving useful information of the features. Embodiments of feature dimensionality reduction described herein may be associated with feature selection and/or feature transformation techniques. The global features ("feature of features") may capture the interplay between different variables and their corresponding features in this higher dimensional space than in the original time domain/space. The global feature vector may then be marked as normal or abnormal based on its signed distance from the multi-modal decision manifold. In one or more embodiments, the reduction process may iterate until the number of features is reduced to a pre-defined number such that the reconstruction of the original data stream from the features achieves a predefined level of accuracy. With the selected feature vector subset, the resilient estimator module 902 may generate a regression map 906 between internal states of the CPS and the measured sensor data 131, received in S410. The regression map 906 may be the C-matrix in the optimization problem described above. In one or more embodiments, the C-matrix may be identified in an offline process and the optimization problem solved in real-time.

Next, in S422, the estimated state 904 is transmitted to a controller/operator 170. The controller/operator 170 may take appropriate action for continuing safe operation and delivery of demands on the CPS. In one or more embodiments, one or more response actions may be performed when an abnormality status signal is transmitted. For example, the system may automatically shut down all or a portion of the CPS (e.g., to let the detected potential cyber-attack be further investigated). As other examples, one or more parameters may be automatically modified, a software application may be automatically triggered to capture data and/or isolate possible causes, etc.

Figure 7:
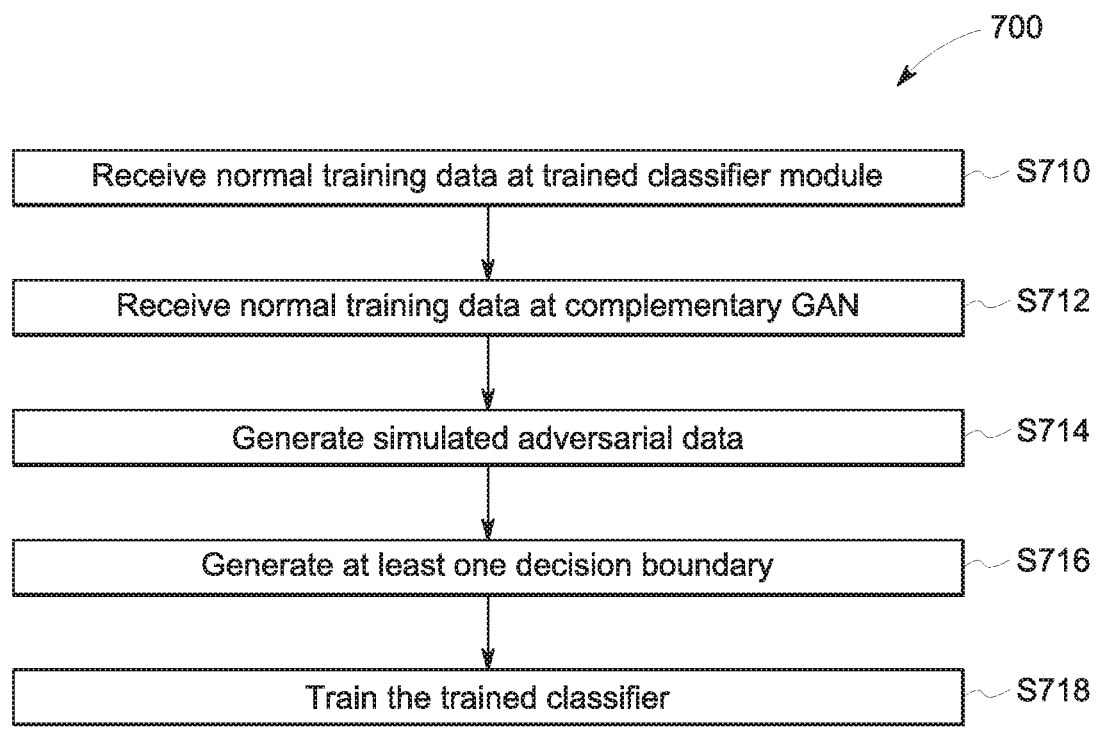
FIG. 7 is a method according to some embodiments.
Figure 8:
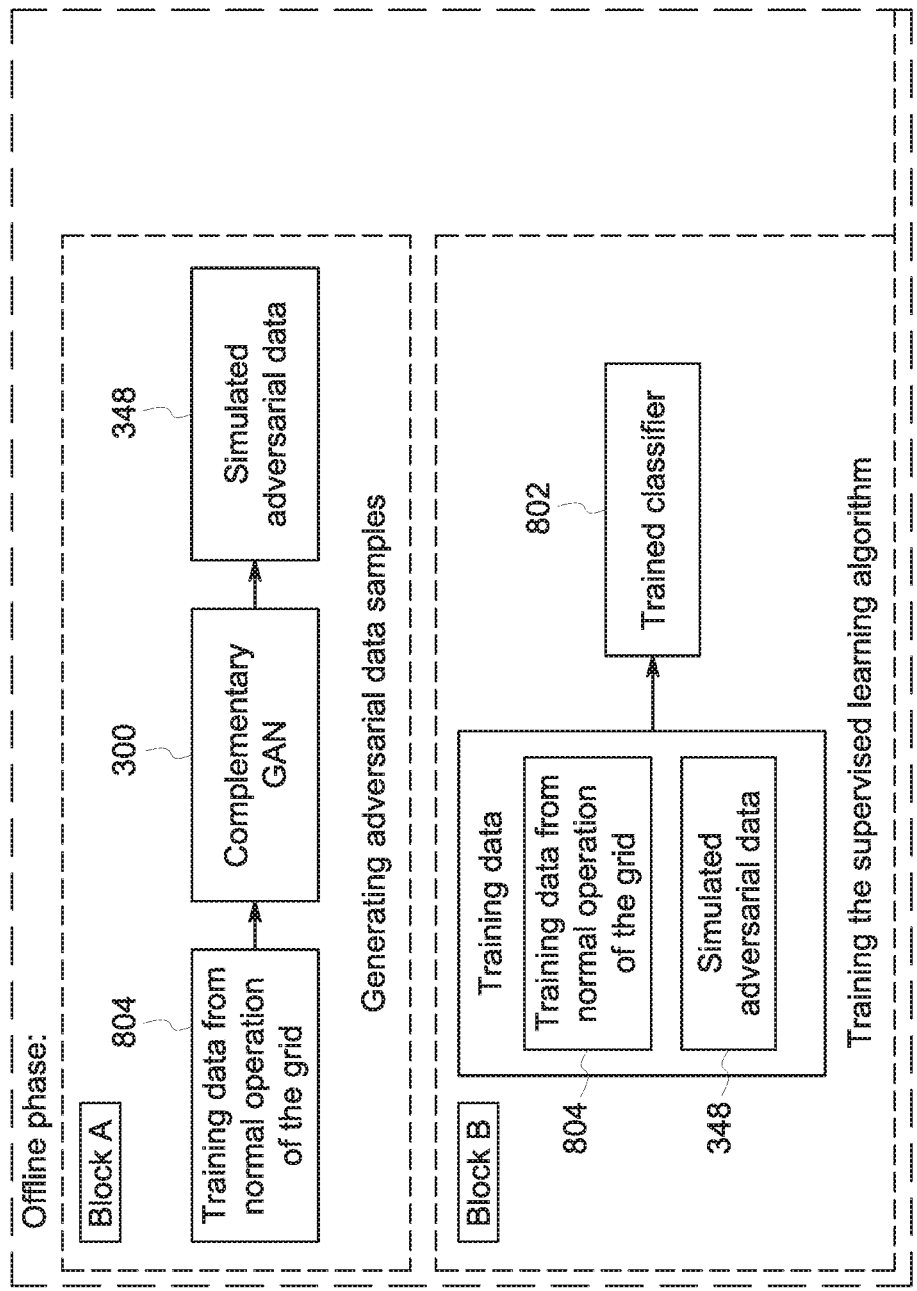
FIG. 8 is an offline situational awareness architecture according to some embodiments.

Turning to FIGS. 7 and 8, a process for training of the trained classifier 802 is provided. It is noted that the process 700 may be executed off-line (e.g., when the CPS is not operating). Initially, at S710, normal training data 804 (e.g., normal feature vectors) from normal operation of the CPS 160 is received at a trained classifier module 802. The training data 804 may be received from one or more sensors during normal operation of the CPS 160. Then in S712, the normal training data 804 is received by a complementary GAN 300. As noted above, unlike conventional GANs, the complementary GAN 300 is optimized to generate data from a distribution complementary to the normal training data distribution. Simulated adversarial data 348 may be generated in S714 via execution of the complementary GAN 300. The complementary GAN-generated abnormal data may comprise data synthesized by the complimentary GAN 300 and created to "look like" abnormal data. The complementary GAN 300 may generate, based on the received normal training data 804, a data set that is complementary to the normal training data 804. The complementary data set 348 may be generated abnormal data (e.g., in feature space or sensor space).

Then, in S716, at least one decision boundary may be generated based on the received training data and simulated adversarial data.

Next, in S718, the trained classifier 802 is trained with a combination of the complementary data set ("simulated adversarial data") 348 and the normal training data 804, with respect to the generated decision boundary, to distinguish between normal and adversarial signals. At the end of the training phase, the complementary GAN 300 may simulate data samples that serve as adversarial examples for the available training data. Note that the complementary GAN 300 may create the generated abnormal data utilizing either no actual abnormal information from the CPS or sparse actual abnormal information from the CPS. It is further noted, to help ensure that the generated samples are constrained in abnormal space and make physical sense, and to help ensure the convergence of a complementary GAN model during training, the complimentary GAN 300 may involve, according to some embodiments, using techniques such as feature matching and virtual batch normalization during the training process. Other techniques that may help ensure consistency of generated samples between two consecutive time stamps may be used in some embodiments. The trained classifier 802 may then be able to distinguish the normal samples from the attack samples. It is noted that the training of the classifier to be a trained classifier may be supervised learning, as labels for the normal data set are known and the abnormal data set is also provided. In one or more embodiments, the output of the trained classifier 802 is a vector where each element describes the probability that the corresponding signal is under attack. The vectors may be used to obtain a decision boundary that separates the data sets for abnormal space and normal space for various elements of the CPS (to detect an anomaly such as cyber-attack or naturally occurring fault). The elements with a probability greater than a predefined threshold are identified to be under attack. It is noted that the predefined threshold describes the acceptable confidence in the decision that the system is in the abnormal space. In one or more embodiments, the set of indices in optimization problem, described above, corresponding to these elements may represent the support of the attack vector (localization), as described above.

Figure 10:
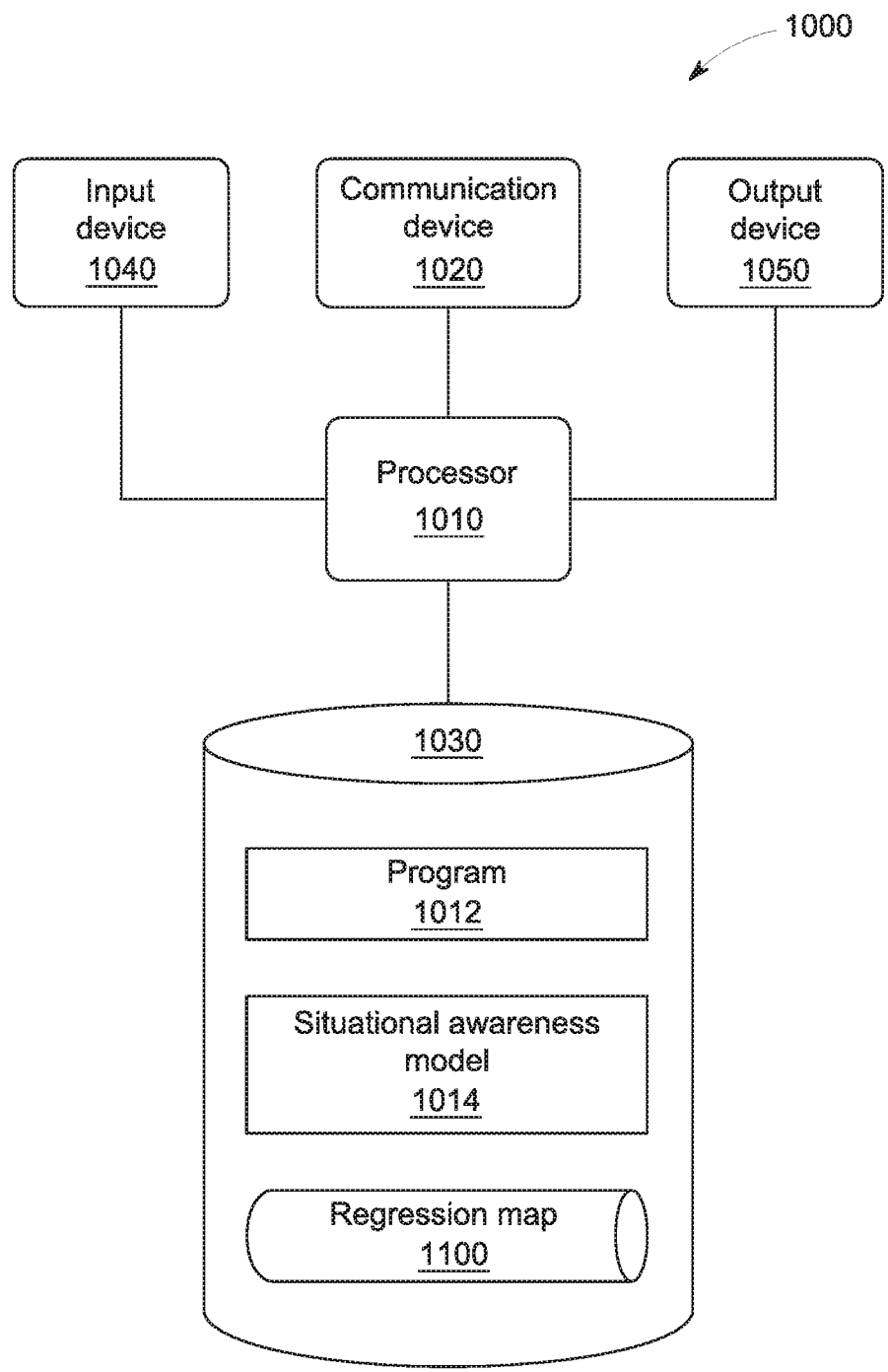
FIG. 10 is a block diagram of a situational awareness platform according to some embodiments of the present invention.

The embodiments described herein may be implemented using any number of different hardware configurations. For example, FIG. 10 is a block diagram of a situational awareness platform 1000 that may be, for example, associated with the system 100 of FIG. 1. The situational awareness platform 1000 comprises a processor 1010, such as one or more commercially available Central Processing Units ("CPUs") in the form of one-chip microprocessors, coupled to a communication device 1020 configured to communicate via a communication network (not shown in FIG. 10). The communication device 1020 may be used to communicate, for example, with one or more remote data source nodes, user platforms, etc. The situational awareness platform 1000 further includes an input device 1040 (e.g., a computer mouse and/or keyboard to input medical device information) and/an output device 1050 (e.g., a computer monitor to render a display, provide alerts, transmit recommendations, and/or create reports). According to some embodiments, a mobile device, monitoring physical system, and/or PC may be used to exchange information with the situational awareness platform 1000.

The processor 1010 also communicates with a storage device 1030. The storage device 1030 may comprise any appropriate information storage device, including combinations of magnetic storage devices (e.g., a hard disk drive), optical storage devices, mobile telephones, and/or semiconductor memory devices. The storage device 1030 stores a program 1012 and/or an situational awareness model 1014 for controlling the processor 1010. The processor 1010 performs instructions of the programs 1012, 1014, and thereby operates in accordance with any of the embodiments described herein. For example, the processor 1010 may receive, from a plurality of heterogeneous data source nodes, a series of data source node values over time associated with operation of the CPS. The processor 1010 may then perform a process to determine whether the received signals are normal or abnormal, and if they are abnormal, the system may determine which nodes provided the signal as well as the actual state of those nodes.

The programs 1012, 1014 may be stored in a compressed, uncompiled and/or encrypted format. The programs 1012, 1014 may furthermore include other program elements, such as an operating system, clipboard application, a database management system, and/or device drivers used by the processor 1010 to interface with peripheral devices.

As used herein, information may be "received" by or "transmitted" to, for example: (i) the situational awareness platform 1000 from another device; or (ii) a software application or module within the situational awareness platform 1000 from another software application, module, or any other source.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems). For example, although some embodiments are focused on a power grid, any of the embodiments described herein could be applied to other types of assets, such as damns, wind farms, etc. Moreover, note that some embodiments may be associated with a display of information to an operator.

In addition to automatic threat detection, some embodiments described herein might provide systems with an additional cyber layer of defense and be deployable without custom programming (e.g., when using operating data). Some embodiments may be sold with a license key and could be incorporated as monitoring service. For example, feature vectors and/or boundaries might be periodically updated when equipment in a CPS is upgraded.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to protect a cyber-physical system having a plurality of monitoring nodes comprising:
   a normal space data source storing, for each of the plurality of monitoring nodes, a series of normal monitoring node values over time that represent normal operation of the cyber-physical system;
   a situational awareness module including an abnormal data generation platform, wherein the abnormal data generation platform is operative to generate abnormal data to represent abnormal operation of the cyber-physical system using values in the normal space data source and a generative model;
   a memory for storing program instructions; and
   a situational awareness processor, coupled to the memory, and in communication with the situational awareness module and operative to execute the program instructions to:
   receive a data signal, wherein the received data signal is an aggregation of data signals received from one or more of the plurality of monitoring nodes, wherein the data signal includes at least one real-time stream of data source signal values that represent a current operation of the cyber-physical system;
   determine, via a trained classifier, whether the received data signal is a normal signal or an abnormal signal, wherein the trained classifier is trained with the generated abnormal data and data stored in the normal space data source;
   localize an origin of an anomaly when it is determined the received data signal is the abnormal signal;
   receive the determination and the origin of the anomaly at a resilient estimator module; and
   execute the resilient estimator module to generate a state estimation for the cyber-physical system.

2. The system of claim 1, wherein the abnormal data generation platform creates at least one of: (i) generated abnormal feature information, and (ii) generated abnormal monitoring node sensor values.

3. The system of claim 1, wherein the generative model comprises a complementary Generative Adversarial Network (GAN).

4. The system of claim 3, wherein the complimentary GAN includes a generator network and a discriminator network.

5. The system of claim 4, wherein the trained classifier is generated with program instructions comprising:
receive a set of normal training data;
generate a simulated adversarial data set via the complementary GAN based on the received set of normal training data;
generate at least one decision boundary based on the received set of normal training data and the simulated adversarial data set; and
train a classifier to distinguish between normal and abnormal signals via the at least one decision boundary to generate the trained classifier.

6. The system of claim 5, wherein the simulated adversarial data set is complementary to the set of normal training data.

7. The system of claim 5, further comprising program instructions to build a regression map between the received set of normal training data and a state of the cyber-physical system.

8. The system of claim 5, wherein the at least one decision boundary is associated with at least one of: (i) a linear boundary, (ii) a non-linear boundary, and (iii) a plurality of boundaries.

9. The system of claim 1, wherein the trained classifier is operative to output, for the received data signal an indication the data signal is one of abnormal or normal.

10. The system of claim 1, wherein localization of the origin of the anomaly is determined based on each monitoring node having its own decision boundary and a time at which a first decision boundary associated with a first monitoring node is crossed as compared to another time at which a second decision boundary associated with a second monitoring node is crossed.

11. The system of claim 1, wherein the abnormal data generation platform creates the generated abnormal data utilizing either: (i) no actual abnormal information from the cyber-physical system, or (ii) sparse actual abnormal information from the cyber-physical system.

12. The system of claim 1, wherein the cyber-physical system is associated with at least one of: (i) a power grid, (ii) an industrial control system, (iii) a heat recovery and steam generation unit, (iv) a turbine, (v) a gas turbine, (vi) an engine, (vii) a jet engine, (viii) a locomotive engine, (ix) a refinery, (x) a dam, (xi) an autonomous vehicle; and (xii) a drone.

13. The system of claim 1, wherein at least one monitoring node is associated with at least one of: (i) a sensor node, (ii) a critical sensor node, (iii) an actuator node, (iv) a controller node, and (v) a key software node.

14. A method comprising:
receiving a data signal, wherein the received data signal is an aggregation of data signals received from one or more of a plurality of monitoring nodes of a cyber-physical system, wherein the data signal includes at least one real-time stream of data source signal values that represent a current operation of the cyber-physical system;
determining, via a trained classifier, whether the received data signal is a normal signal or an abnormal signal, wherein the trained classifier is trained with generated abnormal data and normal training data;
localizing an origin of an anomaly when it is determined the received data signal is the abnormal signal;
receiving the determination and the origin of the anomaly at a resilient estimator module; and
executing the resilient estimator module to generate a state estimation for the cyber-physical system.

15. The method of claim 14, wherein the generated abnormal data comprises at least one of: (i) generated abnormal feature information, and (ii) generated abnormal monitoring node sensor values.

16. The method of claim 14, wherein the generated abnormal data is generated by a complementary Generative Adversarial Network (GAN).

17. A non-transient, computer-readable medium storing instructions to be executed by a processor to perform a method comprising:
receiving a data signal, wherein the received data signal is an aggregation of data signals received from one or more of a plurality of monitoring nodes of a cyber-physical system, wherein the data signal includes at least one real-time stream of data source signal values that represent a current operation of the cyber-physical system;
determining, via a trained classifier, whether the received data signal is a normal signal or an abnormal signal, wherein the trained classifier is trained with the generated abnormal data and normal training data;
localizing an origin of an anomaly when it is determined the received data signal is the abnormal signal;
receiving the determination and the origin of the anomaly at a resilient estimator module; and
executing the resilient estimator module to generate a state estimation for the cyber-physical system.

18. The medium of claim 17, wherein the generated abnormal data comprises at least one of: (i) generated abnormal feature information, and (ii) generated abnormal monitoring node sensor values.

19. The medium of claim 17, wherein the generated abnormal data is generated by a complementary Generative Adversarial Network (GAN).

20. The medium of claim 17, wherein the trained classifier is generated with program instructions comprising:
receive a set of normal training data;
generate a simulated adversarial data set via the complementary GAN based on the received set of normal training data;
generate at least one decision boundary based on the received set of normal training data and the simulated adversarial data set; and
train a classifier to distinguish between normal and abnormal signals via the at least one decision boundary to generate the trained classifier.

* * * * *